K. G. LEE.
FOCUSING DEVICE.
APPLICATION FILED NOV. 24, 1920.
1,414,193.
Patented Apr. 25, 1922.
3 SHEETS—SHEET 2.
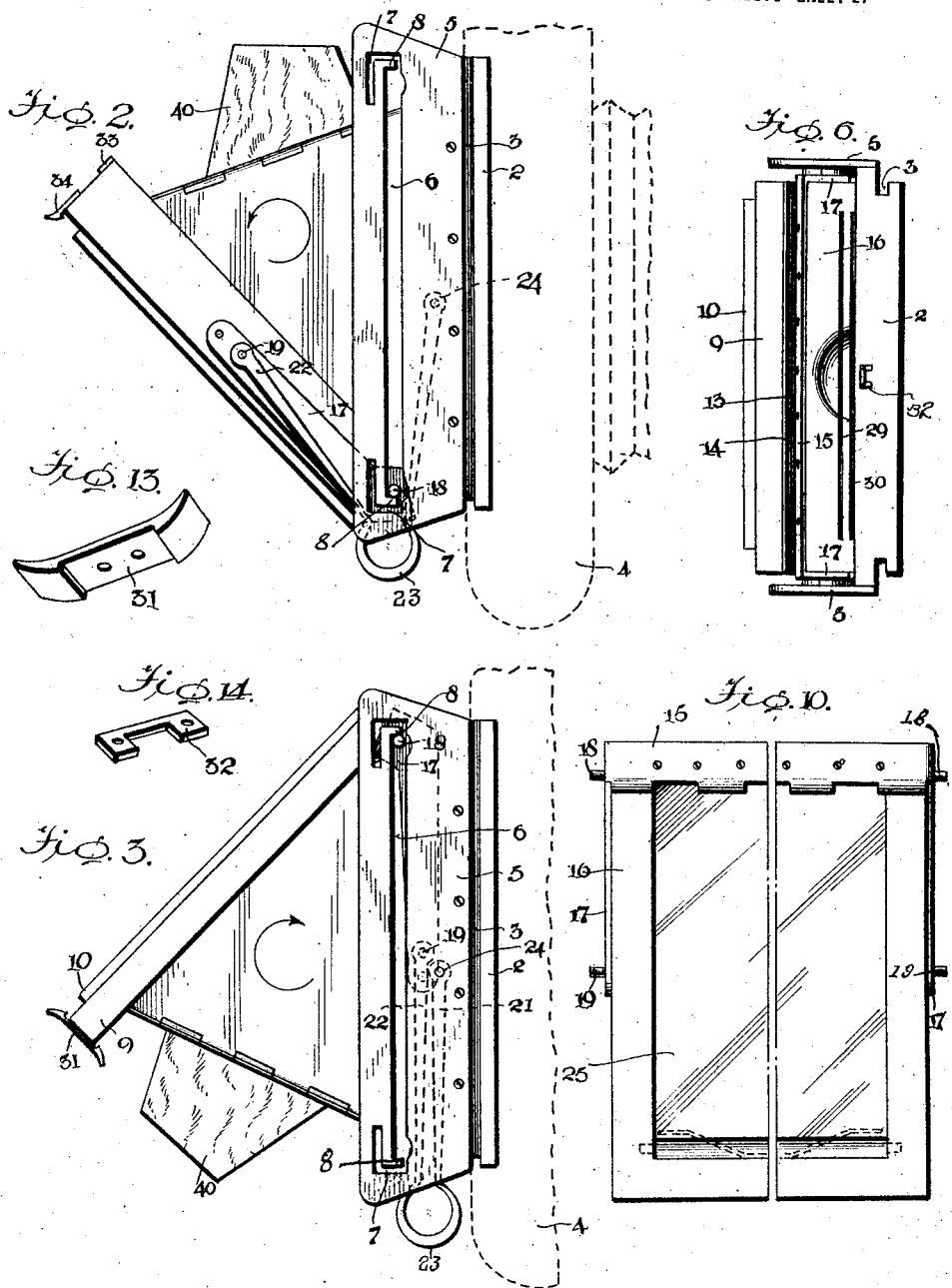
INVENTOR.
Kian Gie Lee,
BY
ATTORNEY.

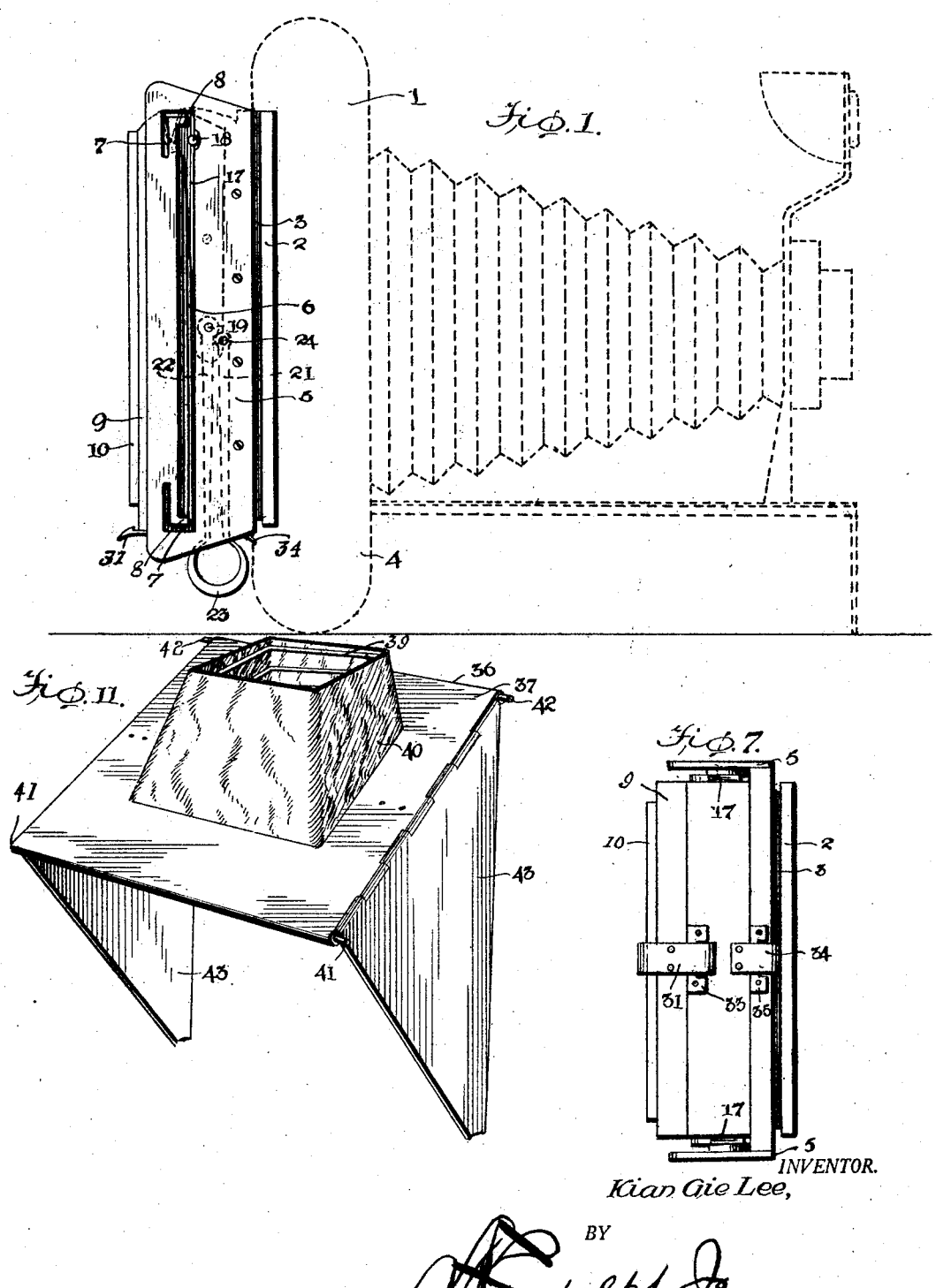

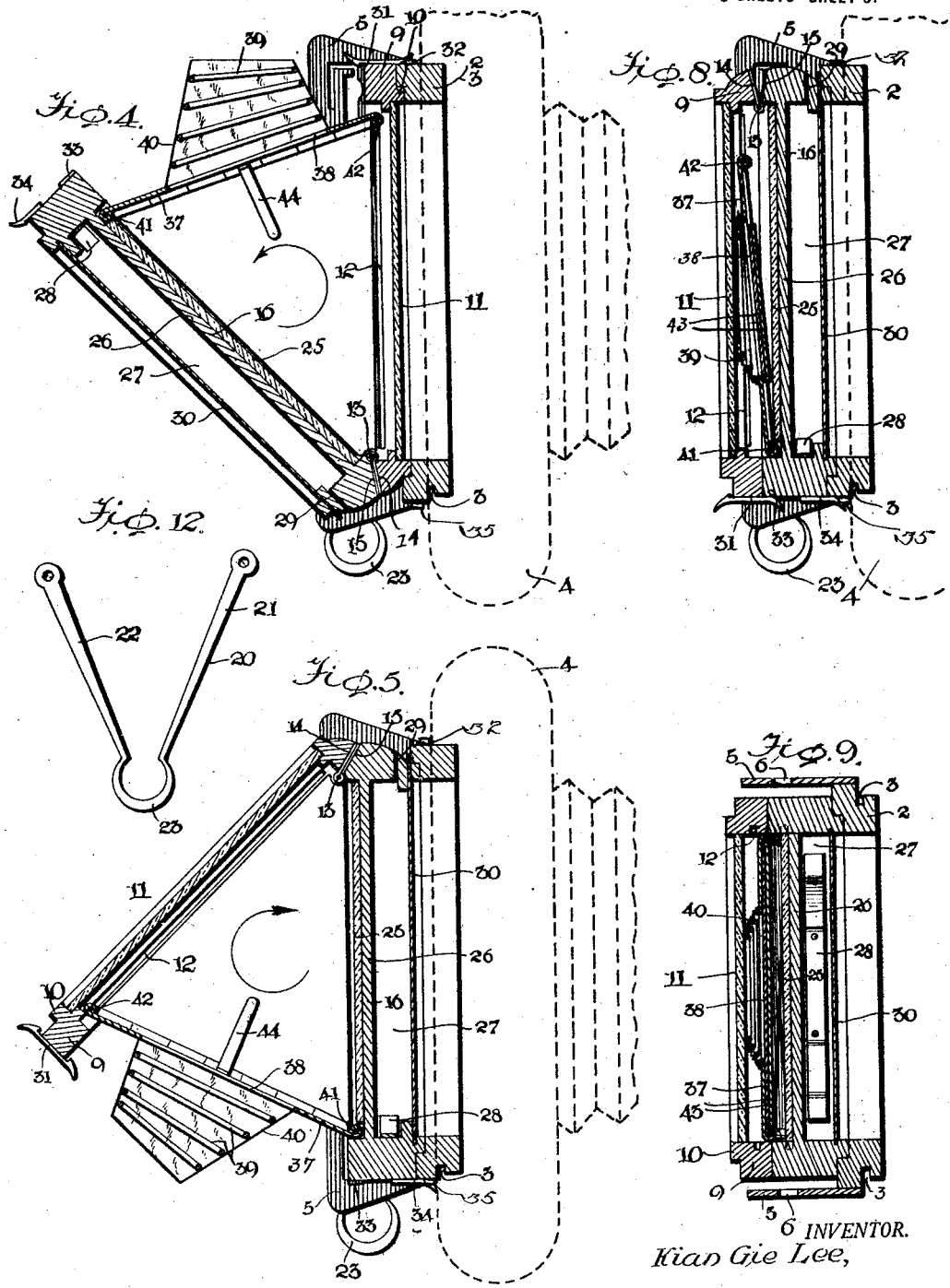

UNITED STATES PATENT OFFICE.

KIAN GIE LEE, OF CHAMPAIGN, ILLINOIS.

FOCUSING DEVICE.

1,414,193.  Specification of Letters Patent.  Patented Apr. 25, 1922.

Application filed November 24, 1920. Serial No. 426,232.

*To all whom it may concern:*

Be it known that I, KIAN GIE LEE, a citizen of China, residing at Champaign, in the county of Champaign and State of Illinois, have invented certain new and useful Improvements in Focusing Devices; and I do hereby declare the following to be a full, clear, and exact description of the invention, such as will enable others skilled in the art to which it appertains to make and use the same.

This invention relates to new and useful improvements in attachments for cameras which may be readily applied to a camera without altering the construction thereof and in a manner similar to attaching an ordinary plate holder, and has for its primary object the provision of a device of the above-stated character which will provide a combined film holder and focusing device for the camera.

Another object of this invention is the provision of means whereby the object focused may be shown in a position right side up to the photographer or operator.

A further object of this invention is the provision of frames for supporting a panel of ground glass and a mirror to reflect to the photographer an object in a position right side up and one of said frames also supports the film for the camera.

A further object of this invention is the provision of means for connecting the frames together and to the camera so that the device may be positioned to focus the camera on an object or be positioned to place the film in the camera to be exposed when the shutter of said camera is actuated.

A further object of this invention is the provision of a tension means which with the aid of the weight of said frames will automatically reverse the position of the device on the camera.

A further object of this invention is the provision of a collapsible eye shield connected to the frame, so that the photographer may easily observe the object reflected by the mirror and which may be folded to lie between the frames and permit of said frames being moved in close relation to each other, thereby forming a compact device on the camera when not in use.

A still further object of this invention is the provision of a focusing device of the above-stated character which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described, and claimed.

For a complete understanding of my invention, reference is to be had to the following description and accompanying drawings, in which:

Figure 1 is a side elevation illustrating a focusing device constructed in accordance with my invention, applied to a camera.

Figure 2 is a side elevation illustrating the focusing device positioned to focus an object, Figure 3 is a similar view illustrating the device positioned to place the film within the camera, Figure 4 is a vertical sectional view illustrating the device in a position to focus the camera on an object, Figure 5 is a similar view illustrating the device positioned to place the film within the camera, Figure 6 is a bottom plan view illustrating the device removed from the camera and in a folded position, Figure 7 is a top plan view illustrating the same, Figure 8 is a vertical sectional view illustrating the device in a folded position.

Figure 9 is a longitudinal sectional view illustrating the device in a folded position.

Figure 10 is a plan view illustrating the combined mirror supporting frame and film holder, Figure 11 is a perspective view illustrating the eye shield removed from the device, Figure 12 is a plan view illustrating the tension means, Figure 13 is a perspective view illustrating one of the catches, Figure 14 is a similar view illustrating a keeper.

Referring in detail to the drawings, the numeral 1 indicates an ordinary camera and to apply my invention thereto, the usual back is removed. A main frame 2 of rectangular formation is provided with grooves 3 to receive the usual ribs formed on the body 4 of the camera 1. The main frame 2 has secured to its sides vertically disposed guide plates 5 which project rearwardly of the main frame and are provided with vertically disposed slots 6. The ends of the slots 6 communicate with L-shaped slots 7 formed in the guide plates and which cooperate with the slots 6 in forming resilient terminals 8 to said guide slots 6.

A ground glass frame 9 is associated with the main frame 2 and has a bead or flange 10 formed thereon which fits within a recess formed within the main frame. The frame 9 supports a panel of ground glass 11 and also is provided with vertically disposed grooves 12. A hinge 13 has its leaf 14 secured to the frame 9 by suitable feasteners and the leaf 15 is secured to the combined film and mirror frame 16 whereby the latter is hingedly connected to the ground glass frame 9. The frames 9 and 16 are provided with beveled faces at points where the leaves 14 and 15 of the hinge 13 are connected and said beveled faces are adapted to limit the movement of the frame 16 outwardly from the frame 9 beyond a given distance. The leaf 15 of the hinge 13 has formed integrally therewith a pair of arms 17 on which are formed pairs of pintles 18 and 19. The pair of pintles 18 fit within the guide slots 6 of the guide plates 5, while the pintles 19 have pivoted thereto tension members 20. The tension members 20 are of substantially V-shape, defining arms 21 and 22 connected by a semicircular tension creating portion 23. The arms 22 of the tension members 20 are pivoted on the pintles 19 while the ends of the arms 21 are pivotally connected to the guide plates 5, as illustrated at 24.

The frame 16 supports a mirror 25 and is provided with a partition 26 that forms a film compartment 27 adapted to receive a pack of films which seats upon a tension spring 28. The frame 16 is provided with a slot 29 in communication with the compartment 27 to receive the usual tabs of the film pack. A slide 30 is adapted to close the film compartment 27 to prevent accidental exposure of the film and extends through a slot in one end of the frame 16 so that the same can be removed when the frame 16 has been positioned to place the film pack within the camera.

A double clutch 31 is secured to the frame 9 and one end thereof is adapted to engage a keeper 32 secured to the main frame 2 for holding the frame 9 in contact with the latter and the other end of the catch 31 is adapted to engage a keeper 33 secured to the frame 16 for holding the latter in engagement with the frame 9. A single catch 34 is secured to the frame 16 and is adapted to engage a keeper 35 on the main frame 2 when said frame 16 has been positioned to place the film pack within the camera.

An eye shield 36 is associated with the frames 9 and 16 and consists of a rectangular plate 37 provided with a sight opening 38 over which is positioned a pyramid-shaped spring frame 39 and the latter has secured thereto a fabric covering 40. The plate 37 is provided with pintles 41 and 42 and the pintles 41 fit within recesses in the frame 16 whereby said plate 37 is hingedly connected to the frame 16, while the pintles 42 fit within the groove 12 of the frame 9, thereby providing a construction which will permit the plate 37 to slide in relation to the frame 9 and occupy a position overlying the mirror 25 and in a plane substantially parallel therewith. The plate 37 occupies this position when the device is in non-use or in a folded position as shown in Figure 1. Triangular-shaped plates 43 are hinged to the side edges of the plate 37 and are adapted to close the space between the frames 9 and 16 when said frame 16 is extended in relation to the frame 9. Leaf springs 44 are secured to the plate 37 and bear against the triangular-shaped plates 43 for holding said plates in operative position but which will permit of said triangular-shaped plates 43 being folded one over the other under the plate 37 when desiring to collapse the device.

To collapse the device in a position as shown in Figure 1 from the position shown in Figure 3, the spring 39 is compressed against the plate 38 and the plate 38 is pushed downwardly in relation to the frame 9 bringing the same into a plane substantially with the mirror 25. Before pressing the plate 38 downwardly, the triangular-shaped plates 43 are folded one over the other against the plate 38. With the plates 37 and 43 in the position described and with the spring 39 still compressed manually, the frame 16 is moved in the direction of the frame 9 until the right hand end of the catch 31 engages the keeper 33 thus firmly locking the frame 16 in engagement with the frame 9 and forming a compact device as shown in Figure 1.

With the device in the position shown in Figure 1, the arms 21 and 22 of the tension members 20 are positioned in close relation to each other, placing said tension members under tension and the catch 31 is disengaged from the keeper 33 and the frame 9 is moved into a position as shown in Figures 3 or 5. The catch 34 is then disengaged from the keeper 35 and the members 20 being under tension will swing the frame 16 from the main frame 2 with the pintles 18 acting as pivots and said pintles 18 then slide downwardly in the slots 6 of the guide plates which causes the frames 16 and 9 to swing in the direction indicated by the arrow in Figures 3 or 5 and assume a position as shown in Figures 2 or 4 with the catch 31 in engagement with the keeper 32, ready for the photographer to use the device to focus the camera on an object. The photographer looking downwardly through the eye shield will see the object through the camera in a position right side up. After proper focusing of the camera and it is desired to expose the film, the catch 31 is disengaged from the keeper 32, which allows the frames 9 and 16 to swing away from the main frame 2 by gravity and this movement places the members 20 under tension to aid in positioning the device as shown in Figures 3 or 5. With the frames 9 and 16 swung away from the main frame 2 by gravity, they are moved upwardly with the pintles 18 sliding upwardly in the slots 6 and said frames 9 and 16 during this movement swing in the direction indicated by the arrow in Figures 2 or 4, which positions the film compartment of the frame 16 next to the camera and with the catch 34 in engagement with the keeper 35. The slide 30 is then withdrawn so that the film may be exposed by the actuation of the shutter of the camera or in the usual way.

When the device is in the last named position, it may be collapsed if desired by first folding the eye shield and then swinging the frame 9 into an engagement with the frame 16 which permits the catch 34 to engage the keeper 35 or, if the device is in a position shown in Figure 2 or 4, it may be collapsed by first folding the eye shield and moving the frame 16 into engagement with the frame 9 and the catch 31 then engages the keeper 33 and retains the device in a folded position with the film department disposed outermost.

While I have shown and described the preferred embodiment of my invention, it will be understood that minor changes in construction, combination and arrangement of parts may be made without departing from the spirit and scope of the invention as claimed.

Having thus described my invention, what I claim is:

1. A camera attachment comprising a ground glass frame, a mirror frame, a ground glass panel carried by the ground glass frame, a mirror carried by the mirror frame, means movably connecting the frames together, means for supporting a film in the mirror frame, and means connecting the frames to a camera and adapted to permit either of said frames to be positioned next to the camera.

2. A camera attachment comprising a pair of frames, means hingedly connecting said frames together, a mirror carried by one of said frames, a ground glass panel carried by the other frame, means adjustably connecting the frames to a camera, and means for supporting a film by one of the frames.

3. A camera attachment comprising a pair of frames, a mirror carried by one of said frames, a ground glass panel carried by the other frame, means for supporting a pack of films within one of the frames, means adjustably connecting the frames to a camera for permitting their positions to be reversed upon the camera, and an eye shield associated with said frames.

4. A camera attachment comprising a pair of frames, a hinge connecting said frames, a mirror carried by one of said frames, a ground glass panel carried by the other frame, a collapsible eye shield carried by the frames and capable of being folded to permit the frames to be moved in close relation to each other, means for supporting a film pack in one of the frames, and means for attaching the frames to a camera to permit the portions of the frames to be reversed on the camera.

5. A camera attachment comprising a main frame, a pair of frames associated with the main frame, a hinge connecting the pair of frames together, a mirror carried by one of the frames of the pair, a ground glass panel carried by the other frame of said pair, means for connecting the pair of frames to the main frame and adapted to permit the positions of the frames to be reversed in respect to the main frame, means for supporting a pack of films in one of the frames of said pair, and a collapsible eye shield associated with the pair of frames.

6. A camera attachment comprising a main frame associated with a camera, a ground glass frame, a mirror frame associated with the main frame, a mirror carried by the mirror frame, a ground glass panel carried by the ground glass frame, a hinge connecting the ground glass frame to the mirror frame, a compartment in the mirror frame for supporting a film pack, a removable slide for concealing the film pack, a collapsible eye shield hinged to the mirror frame and slidably connected to the ground glass frame, and means for adjustably connecting the mirror and ground glass frames to the main frame.

7. A camera attachment comprising a main frame associated with a camera, guide plates secured to the main frame and having vertical slots, a ground glass frame, a mirror frame, frames associated with the main frame, a mirror carried by the mirror frame, a panel of ground glass carried by the ground glass frame, a hinge connecting the mirror and the ground glass frames together, integral arms formed on said hinge, pintles formed on said arms and fitting within the slots, tension means connected to the guide plates and to the arms, and a collapsible eye shield connected to the mirror and ground glass frames.

8. A camera attachment comprising a main frame associated with a camera, mirror and a glass frame, a mirror frame, a hinge connecting the ground glass and mirror frames, integral arms on said hinge and extending parallel with the mirror frame, guide plates carried by the main frame and having vertical slots, pintles on said arms and received by said slots, a mirror carried by the mirror frame, a ground glass panel carried by the ground glass frame, tension members of substantially V-shape pivoted to the guide plate and to the arms, and an eye shield associated with the mirror and ground glass frames.

9. A camera attachment comprising a main frame associated with the camera, guide plates carried by said main frame and having slots, said guide plates having branch slots in communication with the ends of the first named slots to form resilient terminals, a ground glass frame, a mirror frame associated with the main frame, a hinge connecting the mirror and ground glass frames, integral arms formed on the hinge, pintles carried by said arms and fitting within the first named slots, tension members pivoted to said arms and to the guide plates, a collapsible eye shield carried by the mirror and ground glass frames, a double catch carried by the ground glass frame, a keeper carried by the main frame and adapted to be engaged by one of the ends of said catch when the device is in one of its positions, a single catch carried by the mirror frame, a keeper carried by the mirror frame and adapted to be engaged by one end of the double catch to hold the device in a collapsed position, a keeper carried by the main frame and adapted to be engaged by the single catch to hold the device in a collapsed position.

10. A camera attachment comprising a main frame associated with a camera, movable frames associated with the main frame, a ground glass panel carried by one of the movable frames, a mirror carried by one of the movable frames, means hingedly connecting the movable frames together, means connecting the movable frames to the main frame and capable of permitting said movable frames to change their positions in respect to the main frame, a plate pivoted to one of the movable frames and slidably connected to the other movable frame and having a rectangular opening, spring pressed triangular-shaped plates hinged to the side edges of the plate and adapted to close the space between the movable frames, a pyramid-shaped spring carried by said plate about the opening, a cloth cover carried by said spring, a catch for holding one of the movable frames in engagement with the main frame, a catch carried by one of the movable frames for holding the latter in engagement with the main frame, said first catch adapted to hold the movable frames in close relation.

11. A camera comprising a ground glass frame, a mirror frame carrying frames, means movably connecting said frames together, film supporting means carried by the mirror frame, and means for movably connecting the frames to a camera to permit either of the frames to be positioned across the rear side of the camera.

12. A camera comprising a ground glass frame, a mirror frame, film supporting means carried by the mirror frame, and means for movably connecting the frames to a camera to permit either of the frames to be positioned across the rear side of the camera.

13. A camera comprising a ground glass frame, a mirror frame, film supporting means carried by the mirror frame, and means for connecting the frames to a camera to permit either of the frames to be positioned across the rear side of the camera.

14. A camera comprising a ground glass frame, a mirror frame angularly related to the ground glass frame, a film supporting means carried by the mirror frame, and means for connecting the frames to a camera to permit either of the frames to be positioned across the rear side of the camera.

15. A camera comprising a ground glass frame, a mirror frame, film supporting means carried by the mirror frame, and means for pivotally and slidably connecting the frames to the camera to permit either of said frames to be positioned across the rear side of the camera.

16. A camera comprising a ground glass frame, a mirror frame, film supporting means carried by the mirror frame, means for connecting the frames to a camera to permit either of the frames to be positioned across the rear side of the camera, and means for folding said frames in either of their positions.

In testimony whereof I affix my signature in presence of two witnesses.

KIAN GIE LEE.

Witnesses:
M. M. MILLER,
R. C. WHITE.